United States Patent [19]

Cowan et al.

[11] Patent Number: 4,812,672

[45] Date of Patent: Mar. 14, 1989

[54] SELECTIVE CONNECTION OF POWER SUPPLIES

[75] Inventors: Michael L. Cowan, Cary; David C. Goodman, Durham, both of N.C.

[73] Assignee: Northern Telecom Limited, Montreal, Canada

[21] Appl. No.: 103,200

[22] Filed: Oct. 1, 1987

[51] Int. Cl.⁴ .............................................. H02J 9/06
[52] U.S. Cl. ...................................... 307/64; 307/43; 307/85; 307/87; 323/271
[58] Field of Search ............... 307/66, 64, 85, 44, 307/46, 80, 81, 87, 48, 43, 85, 86; 320/13, 18; 365/229; 323/271, 299

[56] References Cited

U.S. PATENT DOCUMENTS

| | | | |
|---|---|---|---|
| 4,492,876 | 1/1985 | Colbert et al. | 307/66 |
| 4,617,473 | 10/1986 | Bingham | 307/66 |
| 4,698,578 | 10/1987 | Mullersman et al. | 307/66 X |

Primary Examiner—William M. Shoop, Jr.
Assistant Examiner—Sharon D. Logan
Attorney, Agent, or Firm—Foley & Lardner, Schwartz, Jeffery, Schwaab, Mack, Blumenthal & Evans

[57] ABSTRACT

A circuit for selectively connecting or disconnecting one of two power supplies, connected in parallel, in the event of the failure of one of the power supplies. The mechanism used is a MOSFET inserted "backwards" in a control circuit such that when the MOSFET is turned "off" no current drain is permitted through the diode internal to the MOSFET. Such a method provides fast switching and may be employed in other circuits as a replacement for relays.

11 Claims, 2 Drawing Sheets

SELECTIVE CONNECTION OF POWER SUPPLIES

FIELD OF THE INVENTION

This invention relates generally to solid state switching. More particularly, the invention relates to the switching of a power supply in or out of a circuit.

BACKGROUND OF THE INVENTION

In the prior art it has been known that it is advantageous in certain circumstances to have more than one power supply connected to a circuit in the event that one of the power supplies fails. In the past the power supplies have been placed in parallel, their connection to the electrical load being controlled by relays which may choose one of the supplies. In the event that the connected power supply fails, a control signal would activate the relays such that the power supply is disconnected from the circuit and another power supply would be connected to the circuit. One problem inherent in this type of design is the slow speed with which the contacts of the relays change position. This leads to a temporary lack of power at the load, which is undesirable. However, the use of relays does provide for low contact resistance between the power supply and the load, and for high isolation when the power supply is not connected to the load.

One might think that a static solid state switching device such as a Metal Oxide Semiconductor Field Effect Transistor (MOSFET) could be used under these circumstances. It is well known that MOSFETs switch quickly relative to relays.

MOSFETs have been tried for this application but have previously been found to be unsatisfactory. The reason for this is that during the construction of the MOSFET a diode is built into the MOSFET for protection reasons. When the MOSFET is installed in its normal fashion in a circuit, the diode is back-biased and consequently turned off and is not a part of the functioning circuit. In an application such as isolating a load from its power supply, when installed normally (i.e. drain connected to supply, and source connected to load), the diode may become forward biased and conducting, thus precluding its use in such an application.

SUMMARY OF THE INVENTION

The present invention replaces the relay with a circuit employing a MOSFET. Such a component will retain the required low contact resistance, while providing fast switching capabilities. The present invention supplies power to the load by, normally, having both power supplies connected in parallel to the load, a faulty or under voltage power supply (i.e. a cause of loss of power) being disconnected by the above circuit.

As is known in the art, the internal design of a MOSFET involves a diode; if the MOSFET is used in its conventional manner that diode would provide a path of conductance between the electrical load and the electrical source. The conventional manner of connecting a MOSFET is to have the drain terminal connected to the power source input; the source terminal connected to the electrical load output; and the gate terminal connected to a controlling signal. In the present invention, the MOSFET is turned around such that the source is connected to the power source and the drain is connected to the electrical load. In such a configuration, a faulty power supply would be completely disconnected from the circuit when the MOSFET was switched off as the internal diode would be oriented such that it would not be able to conduct current between the electrical load and the faulty power supply.

Stated in other terms, the present invention is a method for simultaneously powering an electrical load from first and second power supplies, whereby the first or second power supply can be selectively disconnected from the electrical load in the event of a loss of power, the method comprising: a first circuit for comparing the voltage outputs of the power supplies, the output of the first relative to the second; the first circuit providing a first control signal to a solid state switch, such that the first control signal will turn the switch on or off thus connecting or disconnecting, the first power supply and the load; a second circuit for comparing the voltage outputs of the power supplies, the output of the second relative to the first; the second circuit providing a second control signal to a second solid state switch, such that the second control signal will turn the second switch on or off thus connecting or disconnecting the second power supply and the load.

Stated in yet other terms, the present invention is a solid state circuit for simultaneously powering an electrical load from first and second power supplies, whereby the first or second power supply can be selectively disconnected from the load, the solid state circuit comprising: a first control circuit comprising of a comparator responsive to the magnitudes of the voltage outputs of the two power supplies for producing a control signal representative of the relative magnitudes of the voltages of the first and second power supplies; a first solid state switch responsive to the output of the first control circuit, whereby the first solid state switch will connect or disconnect the first power supply; a second control circuit consisting of a comparator responsive to the outputs of the two power supplies; a second solid state switch responsive to the output of the second control circuit, whereby the second solid state switch will connect or disconnect the second power supply.

DETAILED DESCRIPTION

Figure 1:
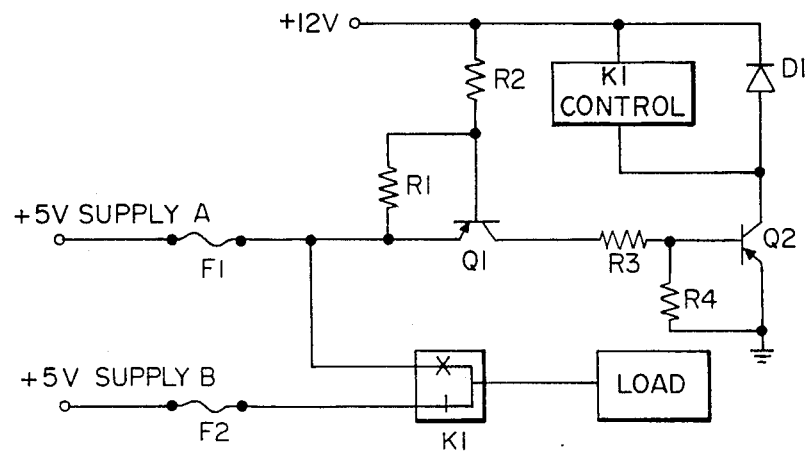
FIG. 1 is a schematic of a prior art circuit for selectively disconnecting a faulty power supply from an electrical load using relays.

In FIG. 1 a schematic diagram of a prior art circuit for selectively disconnecting a faulty power supply from an electrical load is shown. The circuit employs a relay K1 to connect either a master power supply A, or a secondary supply B. If the voltage of the master power supply A falls below a desired level, the control circuitry shown will cause relay K1 contacts to switch, thus disconnecting master power supply A and connecting secondary supply B. If the problem with master power supply A is corrected, and the necessary voltage output is being generated, the circuitry will cause relay K1 contacts to switch back, thus reconnecting master power supply A, and disconnecting secondary supply B.

As discussed above, this type of arrangement may be undesirable due to the relatively slow movement of the wiper arms of relay K1 which would cause a temporary power outage to the load.

Figure 2:
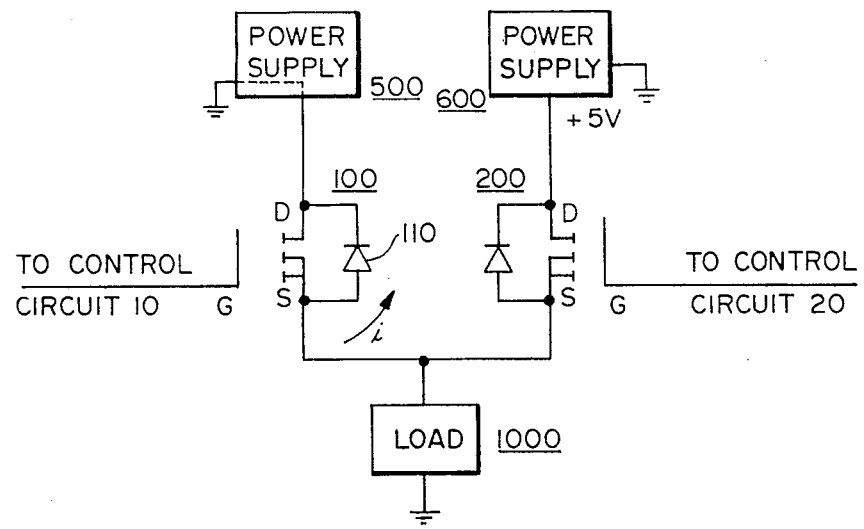
FIG. 2 is a schematic of a circuit utilizing MOSFETs in the most commonly used orientation.

In FIG. 2 a schematic diagram of a circuit employing MOSFETs oriented in a more commonly used fashion is shown. The problem with the use of MOSFETs oriented as such for a circuit to turn off a faulty power supply has been discussed above. FIG. 2 illustrates that if power supply 500 fails (in this example creating a direct path to ground), even though the control circuit 10 would shut off MOSFET 100 there would still be a path for current to flow between the electrical load 1000 and the faulty power supply 500 (represented by the letter i) through the MOSFET's diode 110. This is an undesirable situation.

A preferred embodiment of the present invention will now be described by way of example only, and with reference to FIG. 3.

Figure 3:
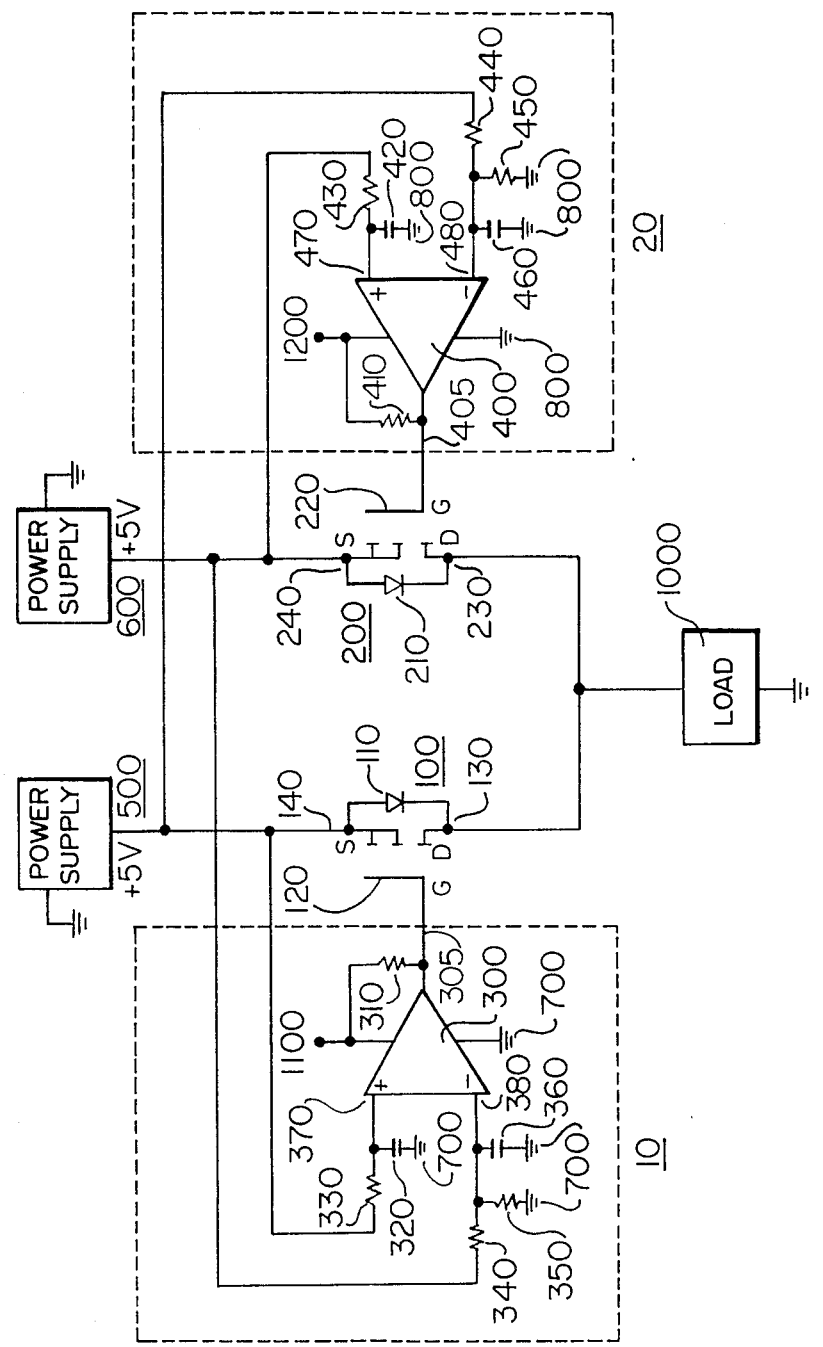
FIG. 3 is a schematic of a circuit according to the present invention for selectively disconnecting a faulty power supply from an electrical load using MOSFETs.

In FIG. 3 two control circuits 10 and 20 and two solid state switches 100 and 200 are shown. Both control circuits 10 and 20 are identical, and therefore only circuit 10 will be described in detail. The functionality of corresponding components of control circuit 20 may be determined by adding 100 to the reference number indicated for control circuit 10. solid state switches 100 and 200 are also identical, and therefore only solid state switch 100 will be described in detail. The functionality of corresponding components of solid state switch 200 may be determined by adding 100 to the reference number indicated for solid state switch 100.

The purpose of the control circuits 10 and 20 are to monitor the voltages of power supplies 500 and 600 and in response thereto to provide a control signal 305 and 405 to solid state switches 100 and 200, respectively, to connect or disconnect power supplies 500 and 600 as appropriate. Solid state switch 100 is a MOSFET having internal diode 110, gate terminal 120, drain terminal 130, and source terminal 140. Source terminal 140 is connected to a five volt power supply 500. Drain terminal 130 is connected to electrical load 1000. MOSFET 100 is controlled (i.e. switched on and off) by control signal 305 appearing on gate terminal 120. In order for MOSFET 100 to be turned "on", the voltage at gate terminal 120 must be at least four volts higher than the voltage at source terminal 140. Control signal 305 is generated by control circuit 10 having a comparator 300 which is powered from a twelve volt power supply 1100 and connected to system ground 700. Non-inverting input 370 of comparator 300 is connected to power supply 500 via resistor 330. Resistor 330 and capacitor 320 are used to provide noise immunity. Inverting input 380 of comparator 300 is connected to a five volt power supply 600 via resistor 340. Resistor 340 and capacitor 360 are also used to provide noise immunity. Resistor 340 and resistor 350 are used to create a threshold voltage which is slightly less than the voltage level of power supply 600. In this arrangement, when the voltage of power supply 500 is greater than the threshold voltage, the output of comparator 300 will be approximately twelve volts, thus providing a gate 120 to source 140 voltage of approximately seven volts, turning MOSFET 100 "on". If power supply 500 falls or is disconnected, its voltage will fall below the threshold voltage, causing the output of comparator 300 to be approximately zero volts, thus turning MOSFET 100 "off".

Control circuit 20 operates in a similar fashion, except the non-inverting input 470 of comparator 400 is connected to power supply 600 and the inverting input 480 of comparator 400 is connected to power supply 500.

In another embodiment the "reversed" MOSFET may be used in a control circuit to provide extremely fast solid state switching in place of a slower, more traditional relay circuit.

What is claimed is:

1. A method for simultaneously powering an electrical load from first and second power supplies, whereby said first power supply can be selectively disconnected from said electrical load in the event of a loss of power from said first power supply, said method comprising the steps of:

comparing voltage outputs of said first power supply and said second power supply;

providing a binary control signal indicative of the voltage output of said first power supply being above or below a predetermined threshold level;

operating an N-channel MOSFET, having at least source, drain, and gate terminals, such that:

said source terminal is connected to said first power supply;

said drain terminal is connected to said electrical load; and said gate terminal is connected to said control signal, said MOSFET being responsive to said control signal;

connecting said first power supply to said load by driving said MOSFET to an on state with said control signal when the voltage output of said first power supply is above said predetermined threshold level;

disconnecting said first power supply from said load by driving said MOSFET to an off state with said control signal when the voltage output of said first power supply is below said predetermined threshold level.

2. The method as claimed in claim 1 wherein said step of comparing voltage outputs is performed by a comparator with its inverting input responsive to the voltage output of said first power supply and its non-inverting input responsive to the voltage output of said second power supply, the output of said comparator providing said control signal.

3. A method for selectively connecting and disconnecting a first or second power supply to an electrical load whereby said first and second power supplies can be simultaneously connected to said load, and whereby aid first or second power supply can be disconnected from said electrical load in the event of a loss of power from said first or second power supply respectively, said method comprising the steps of:

comparing a voltage output of said first power supply to a voltage output of said second power supply;

providing a first control signal indicative of the voltage output of said first power supply being above or below a predetermined threshold level;

orienting a first N-channel MOSFET, having at least source, drain, and gate terminals, such that said source terminal of said first MOSFET is connected to said first power supply, said drain terminal of said first MOSFET is connected to said first control signal;

connecting said first power supply to said load by driving said first MOSFET to an on state with said first control signal when the voltage level of said first power supply is above said predetermined threshold level;

disconnecting said first power supply from said load by driving said first MOSFET to an off state with said first control signal when the voltage level of said first power supply being is below said predetermined threshold level;

comparing the voltage output of said second power supply to the voltage output of said first power supply;

providing a second control signal indicative of the voltage level of said second power supply being above or below a predetermined threshold level;

orienting a second N-channel MOSFET, having at least source, drain, and gate terminals, such that source terminal of aid second MOSFET is connected to said second power supply, said drain terminal of said second MOSFET is connected to said electrical load, and said gate terminal of said second MOSFET is connected to said second control signal;

connecting said second power supply to said load by driving said second MOSFET to an on state with said second control signal when the voltage level of said second power supply is above said predetermined threshold level;

disconnecting said second power supply from said load by driving said second MOSFET to an off state with said control signal when the voltage level of said second power supply is below said predetermined threshold level.

4. The method as claimed in claim 3 wherein each step of comparing voltage outputs is performed by a comparator with its inverting input responsive to the voltage output of a first one of said first or second power supplies and its non-inverting input responsive to the voltage output of a second one of said first or second power supplies, said comparator providing respective first or second control signals.

5. A solid state circuit for simultaneously powering an electrical load from first and second power supplies, whereby said first power supply can be selectively disconnected from said electrical load in the event of a loss of power from said first power supply, said solid state circuit comprising:

a control circuit comprising a comparator responsive to the magnitude of the voltage outputs of said first power supply and a second power supply for producing a control signal representative of the relative magnitudes of the voltages of said first and second power supplies; and a solid state switch responsive to said control signal from said control circuit, whereby said solid state switch will connect said first power supply to said load or disconnect said first power supply from said load, wherein said solid state switch is an N-channel MOSFET, having at least source, drain, and gate terminals, and is oriented such that:

said source terminal is connected to said first power supply;

said drain terminal is connected to said electrical load; and said gate terminal is connected to said control signal.

6. A solid state circuit for selectively connecting first and second power supplies connected, in parallel, to an electrical load, or disconnecting said first or second power supplies from said electrical load, whereby said first and second power supplies can be simultaneously connected to said load, said solid state circuit comprising:

a first control circuit comprising a comparator responsive to the voltage outputs of said first and second power supplies;

a first solid state switch responsive to the output of said first control circuit, whereby said first solid state switch will connect or disconnect said first power supply;

a second control circuit comprising a comparator responsive to the voltage outputs of said first and second power supplies;

a second solid state switch responsive to the output of said second control circuit, whereby said second solid state switch will connect or disconnect said second power supply, wherein said first and second solid state switches are N-channel MOSFETs, having at least source, drain, and gate terminals, and are oriented such that:

said source terminal of said first solid state switch is connected to said first power supply;

said drain terminal of said first solid state switch is connected to said electrical load; and said gate terminal of said first solid state switch is connected to said first control signal;

said source terminal of said second solid state switch is connected to said second power supply;

said drain terminal of said second solid state switch is connected to said electrical load; and said gate terminal of said second solid state switch is connected to said second control signal.

7. A method for powering an electrical load from a plurality of selectively disconnectable power supplies having voltage outputs, the method comprising the steps of:

comparing each power supply voltage output with a predetermined threshold voltage level and generating a corresponding individual control signal for each power supply voltage comparison; and applying each said individual control signal to a gate terminal of only one of a plurality of MOSFETs, each said MOSFET having a source terminal connected to the voltage output of a power supply corresponding to the individual control signal and a drain terminal connected to said electrical load, each said MOSFET operating to connect and disconnect each said power supply to said load based on said control signal.

8. The method of claim 7 wherein each MOSFET is an N-channel MOSFET.

9. The method of claim 7 further comprising the steps of:

deriving the predetermined threshold voltage level for comparison with the voltage output of a power supply from a voltage output of a different power supply.

10. The method of claim 7 further comprising the steps of:

driving each MOSFET to connect the source to the drain when the power supply voltage output connected to the source exceeds the predetermined threshold; and driving each MOSFET to disconnect the source from the drain when the power supply voltage output connected to the source is below the predetermined threshold.

11. A solid state circuit for connecting or disconnecting one of two power supplies (500,600), connected to an electrical load (1000) in parallel, comprising:

- a first control circuit (10) comprising: a comparator (300), the non-inverting input (370) of which is connected to one of said two power supplies (500) via a noise immunity circuit (320,330); the inverting input (380) of said comparator being connected to the second of said two power supplies (600) via a noise immunity circuit (340,360) and a threshold voltage circuit (340,350);
- a first solid state switch oriented such that the output (305) of said comparator (300) is connected to the gate terminal (120) of an N-channel enhancement-mode MOSFET (100); the source terminal (140) of said MOSFET (100) connected to the first of said two power supplies (500); and the drain terminal (130) of said MOSFET (100) connected to said electrical load (1000);
- a second control circuit (20) comprising: a comparator (400), the non-inverting input (470) of which is connected to the second of said two power supplies (600) via a noise immunity circuit (420,430); the inverting input (480) of said comparator being connected to the first of said two power supplies (500) via both a noise immunity circuit (440,460) and a threshold voltage circuit (440,450);
- a second solid state switch oriented such that the output (405) of said comparator (400) is connected to the gate terminal (220) of an N-channel enhancement-mode MOSFET (200); the source terminal (240) of said MOSFET (200) connected to the second of said two power supplies (600); and the drain terminal (230) of said MOSFET (200) connected to said electrical load (1000).

* * * * *